(12) United States Patent
Kumar

(10) Patent No.: US 11,204,103 B2
(45) Date of Patent: Dec. 21, 2021

(54) COINED SEAT FOR METAL-TO-METAL SEATING

(71) Applicant: Hamilton Sundstrand Corporation, Charlotte, NC (US)

(72) Inventor: Rajesh Kumar, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 35 days.

(21) Appl. No.: 16/122,469

(22) Filed: Sep. 5, 2018

(65) Prior Publication Data

US 2019/0145537 A1    May 16, 2019

(30) Foreign Application Priority Data

Nov. 13, 2017    (IN) .............................. 201711040415

(51) Int. Cl.
*F16K 17/04* (2006.01)
*F16K 15/04* (2006.01)
(Continued)

(52) U.S. Cl.
CPC ........ *F16K 17/0406* (2013.01); *F16K 15/044* (2013.01); *F16K 17/0466* (2013.01); *F15B 15/261* (2013.01); *F16K 27/0245* (2013.01)

(58) Field of Classification Search
CPC ............. F16K 17/0406; F16K 17/0466; Y10T 29/49409; B21D 22/04
See application file for complete search history.

(56) References Cited

U.S. PATENT DOCUMENTS

| 2,697,953 | A |   | 12/1954 | Everett |
|---|---|---|---|---|
| 3,035,610 | A | * | 5/1962 | Prunty .................... F15B 13/04 137/596.13 |

(Continued)

FOREIGN PATENT DOCUMENTS

| DE | 19509776 A1 | 9/1996 |
|---|---|---|
| JP | 2011154957 A | 8/2011 |

OTHER PUBLICATIONS

English Machine Translation of DE 195 09 776 A1 from espacenet. com (Year: 1995).*

(Continued)

*Primary Examiner* — Reinaldo Sanchez-Medina
*Assistant Examiner* — Nicole Gardner
(74) *Attorney, Agent, or Firm* — Cantor Colburn LLP

(57) ABSTRACT

A pressure relief valve (PRV) is provided. The PRV includes a first housing part and a second housing part. The first housing part includes first major and minor surfaces and a first deformed corner at an intersection of the first major and minor surfaces. The second housing part includes second major and minor surfaces and a second deformed corner at an intersection of the second major and minor surfaces. The first and second housing parts are disposed with the first and second minor surfaces facing oppositely at a distance to define a metering hole. The first and second deformed corners are deformed by a coining ball to cooperatively form a coined seat at the metering hole for seating and re-seating a sealing ball. The first and second deformed corners have respective radii of curvatures resulting from deformation which are larger than that of the sealing ball.

3 Claims, 4 Drawing Sheets

(51) Int. Cl.
*F16K 27/02* (2006.01)
*F15B 15/26* (2006.01)

(56) References Cited

U.S. PATENT DOCUMENTS

| | | |
|---|---|---|
| 5,107,890 A | 4/1992 | Gute |
| 6,840,270 B2 | 1/2005 | Yu et al. |
| 7,210,494 B2 * | 5/2007 | Ott .......................... F16K 29/00 137/15.18 |
| 7,832,661 B2 | 11/2010 | Imoehl et al. |
| 8,382,454 B2 | 2/2013 | Aso |
| 9,797,519 B2 | 10/2017 | Gyger et al. |
| 2005/0150109 A1 | 7/2005 | Umemura et al. |

OTHER PUBLICATIONS

EP Search Report dated Mar. 29, 2019 in EP application No. 18205973.3, 10 pages.

* cited by examiner

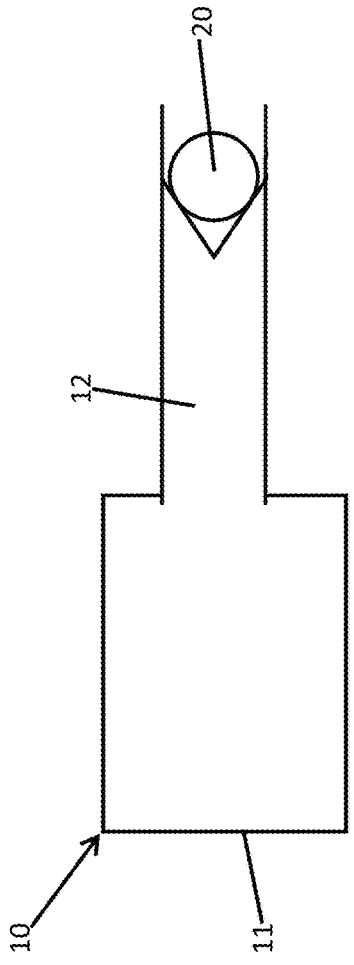
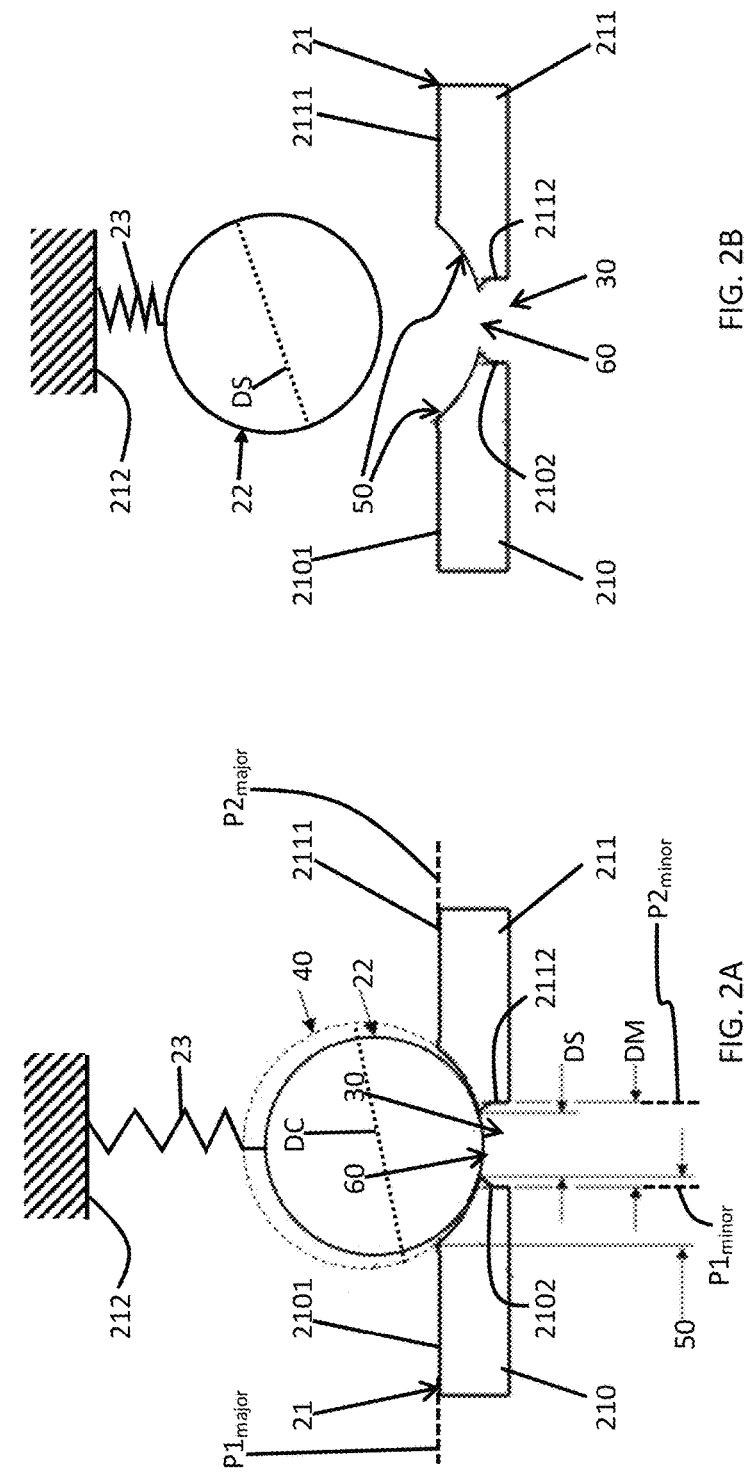

COINED SEAT FOR METAL-TO-METAL SEATING

CROSS-REFERENCE TO RELATED APPLICATIONS

This application claims the benefit of Indian Application No. 201711040415, which was filed Nov. 13, 2017. The entire contents of Indian Application No. 201711040415 are incorporated herein by reference.

BACKGROUND

The following description relates to actuators and, more specifically, to hydraulic locking actuators with pressure relief valves in which the valve seat is for metal-to-metal seating.

Hydraulic locking actuators on aircraft often incorporate pressure relief valves (PRVs) to maintain system pressure within specified limits. This protects the actuator and actuator mounting brackets on aircraft nacelles from overload conditions due to over-pressurization. Typically, PRV design is based on metallic sealing in which a spring-loaded ball is held against a metallic seat.

BRIEF DESCRIPTION

According to an aspect of the disclosure, a PRV is provided. The PRV includes a first housing part and a second housing part. The first housing part includes first major and minor surfaces and a first deformed corner at an intersection of the first major and minor surfaces. The second housing part includes second major and minor surfaces and a second deformed corner at an intersection of the second major and minor surfaces. The first and second housing parts are disposed with the first and second minor surfaces facing oppositely at a distance to define a metering hole and the first and second deformed corners are deformed by a coining ball to cooperatively form a coined seat at the metering hole for seating and re-seating a sealing ball. The first and second deformed corners have respective radii of curvatures resulting from deformation which are larger than that of the sealing ball.

In accordance with additional or alternative embodiments, the coined seat includes a first curved edge and first corners at opposite ends of the first curved edge at the first housing part and the coined seat includes a second curved edge and second corners at opposite ends of the second curved edge at the second housing part.

In accordance with additional or alternative embodiments, the respective radii of curvatures of the first and second curved edges are similar to that of the coining ball.

In accordance with additional or alternative embodiments, the first corners include a first major surface corner which protrudes upwardly from a plane of the first major surface and a first minor surface corner which protrudes inwardly from a plane of the first minor surface and the second corners include a second major surface corner which protrudes upwardly from a plane of the second major surface and a second minor surface corner which protrudes inwardly from a plane of the second minor surface.

In accordance with additional or alternative embodiments, the first and second minor surface corners are disposed at the metering hole to define a sealing hole having a smaller diameter than the metering hole.

In accordance with additional or alternative embodiments, the first and second minor surface corners are disposed at the metering hole to define a sealing hole having a diameter which is about 10% smaller than that of the metering hole.

In accordance with additional or alternative embodiments, the first and second housing parts are up to 55 absolute hardness.

According to another aspect of the disclosure, a pressure relief valve (PRV) is provided and includes first and second housing parts respectively including first and second major and minor surfaces and first and second deformed corners at respective intersections of the first and second major and minor surfaces, the first and second housing parts being disposed with the first and second minor surfaces facing oppositely at a distance to define a metering hole and a sealing ball which is elastically biased toward the metering hole. The first and second deformed corners are deformed by a coining ball having a larger diameter than the sealing ball to cooperatively form a coined seat at the metering hole for seating and re-seating the sealing ball.

In accordance with additional or alternative embodiments, a third housing part fixed relative to the first and second housing parts and an elastic element coupled at opposite ends thereof to the sealing ball and the third housing part to elastically bias the sealing ball toward the metering hole.

In accordance with additional or alternative embodiments, the coined seat includes a first curved edge and first corners at opposite ends of the first curved edge at the first housing part and the coined seat includes a second curved edge and second corners at opposite ends of the second curved edge at the second housing part.

In accordance with additional or alternative embodiments, the first and second curved edges have respective radii of curvatures similar to that of the coining ball and greater than that of the sealing ball.

In accordance with additional or alternative embodiments, the first corners include a first major surface corner which protrudes upwardly from a plane of the first major surface and a first minor surface corner which protrudes inwardly from a plane of the first minor surface and the second corners include a second major surface corner which protrudes upwardly from a plane of the second major surface and a second minor surface corner which protrudes inwardly from a plane of the second minor surface.

In accordance with additional or alternative embodiments, the first and second minor surface corners are disposed at the metering hole to define a sealing hole having a smaller diameter than the metering hole.

In accordance with additional or alternative embodiments, the first and second minor surface corners are disposed at the metering hole to define a sealing hole having a diameter which is about 10% smaller than that of the metering hole.

In accordance with additional or alternative embodiments, the first and second housing parts and the sealing ball have similar absolute hardness and are less hard than the coining ball.

In accordance with additional or alternative embodiments, the first and second housing parts are up to 55 absolute hardness, the sealing ball has 40-70 absolute hardness and the first and second housing parts and the sealing ball are less hard than the coining ball.

In accordance with additional or alternative embodiments, a hydraulic locking actuator is provided and includes an actuator element, an inlet by which fluid is provided to the actuator element and the PRV disposed along the inlet to prevent an overpressure condition at the actuator element.

According to yet another aspect of the disclosure, a method of assembling a pressure relief valve is provided and includes providing first and second housing parts respectively including first and second major and minor surfaces and first and second corners at respective intersections of the first and second major and minor surfaces, disposing the first and second housing parts such that the first and second minor surfaces face oppositely at a distance to define a metering hole toward which a sealing ball will be elastically biased and deforming the first and second corners with a coining ball having a larger diameter than the sealing ball such that the first and second housing parts cooperatively form a coined seat at the metering hole for seating and re-seating the sealing ball.

In accordance with additional or alternative embodiments, the method further includes selecting materials for the coining ball which are harder than those of the first and second housing parts and the sealing ball.

In accordance with additional or alternative embodiments, the deforming includes increasing a load on the coining ball until further deformation is negligible.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 1 is a schematic illustration of a hydraulic locking actuator in accordance with embodiments;

FIG. 2A is a side view of a pressure relief valve of the hydraulic locking actuator of FIG. 1 with a seated sealing ball in accordance with embodiments;

FIG. 2B is a side view of a pressure relief valve of the hydraulic locking actuator of FIG. 1 with an unseated sealing ball in accordance with embodiments;

Figure 4:
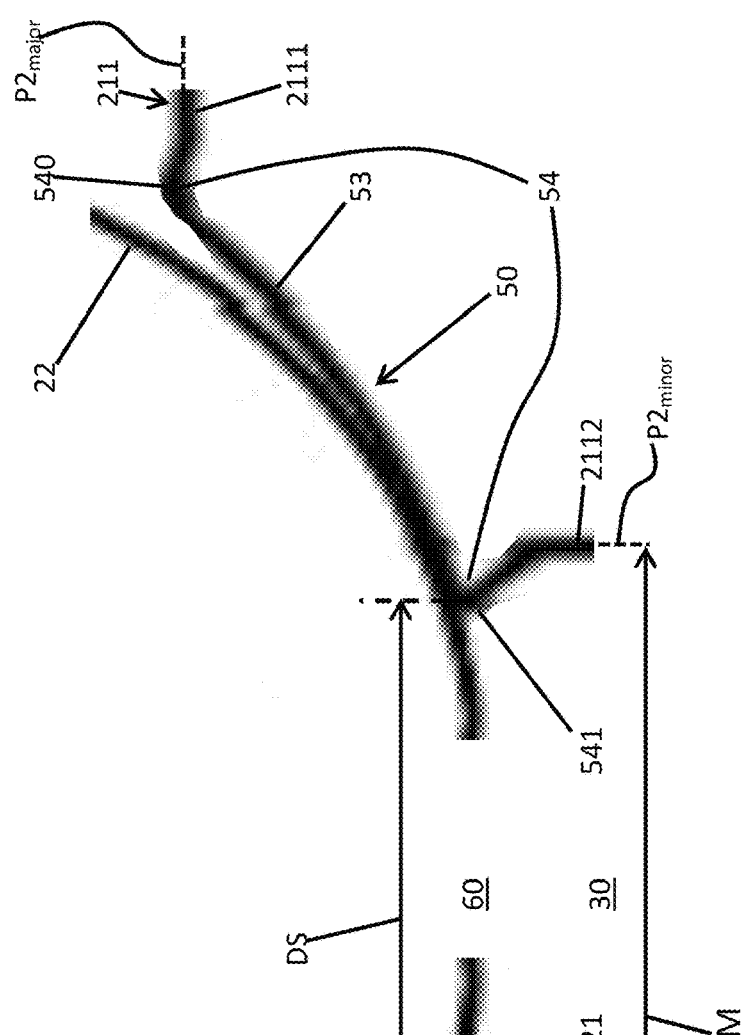
FIG. 4 is an enlarged side view of a portion of the pressure relief valve of FIG. 2A in accordance with embodiments.

These and other advantages and features will become more apparent from the following description taken in conjunction with the drawings.

DETAILED DESCRIPTION

PRVs in aircraft applications are sized for cracking, flow point and re-seat pressures. Since the actuators to which the PRVs are often connected are hydraulic locking actuators, there exists a leakage requirement for the PRVs at a re-seat pressure so that the hydraulic lock actuators do not descend in the loaded condition, due to leakage. This leakage requirement may be, for example, less than or equal to 3 drops per minute.

In conventional PRVs, the coined-seat is formed with a coining ball that is substantially the same size as the PRV assembly ball. This leads to substantially excessive leakage of about 7 to 8 drops per 10 seconds at the re-seat pressure as well as unreliable re-seat operations due to the excessive leakage (i.e., a continuous or nearly continuous stream of fluid at pressures less than $\frac{1}{3}^{rd}$ of the re-seat pressure can prevent reliable re-seating).

Thus, as an improvement in some PRVs, the coining ball diameter was increased so as to be slightly larger than the assembly or PRV ball diameter. This still did not result in improved leakage prevention, however, and continued excessive and uncontrolled leakage were observed on PRVs.

As will be described below, a coined seat is provided. The coined seat evolved from the notion that a load exists at which a coined seat is produced in a housing and, based on iteratively increasing load applications, the yielding (plastic deformation) of the edge of the housing occurs. That is, as loads are increased during coining operations, localized plastic yielding occurs on the edge of the housing being coined. The resulting deformation leads to a deformed edge that takes the shape of the coining ball (e.g., circular) because the volume of the yielded material effectively flows around the coining ball in a free zone (i.e., outwardly and inwardly with respect to the metering hole). The material which flows inwards with respect to the metering hole forms the seat for the sealing ball upon assembly and is referred to as a coined seat. The coined-seat attains an equilibrium state after a certain load level is reached, beyond which further seat deformation is negligible. This load level is referred to as the "coining load" to form the coined seat.

With reference to FIG. 1, a hydraulic locking actuator 10 is provided for use in various applications such as, but not limited to, aircraft and engine nacelle actuation. The hydraulic actuator 10 includes an actuator element 11, an inlet 12 by which fluid is provided to the actuator element 11 and a PRV 20. The PRV 20 is disposed along the inlet 12 and is configured to prevent an overpressure condition at the actuator element 11.

With continued reference to FIG. 1 and with additional reference to FIGS. 2A, 2B, 3 and 4, the PRV 20 includes a housing 21, a sealing ball 22 and an elastic element 23. At least initially, the housing 21 includes a first housing part 210, a second housing part 211 and a third housing part 212 which is fixed relative to the first and second housing parts 210 and 211. The first housing part 210 includes a first major surface 2101, a first minor surface 2102 and a first corner 2103 (see FIG. 6) at an intersection of the first major and minor surfaces 2101 and 2102. Similarly, at least initially, the second housing part 211 includes a second major surface 2111, a second minor surface 2112 and a second corner 2113 (see FIG. 6) at an intersection of the second major and minor surfaces 2111 and 2112.

As shown in FIGS. 1, 2A, 2B, 3 and 4, the first and second housing parts 210 and 211 are disposed with the first and second minor surfaces 2102 and 2112 facing each other in opposite directions and at a distance to define a metering hole 30. The respective planes P1$_{major}$ and P2$_{major}$ of the first and second major surfaces 2101 and 2111 are substantially parallel and co-planar. The respective planes P1$_{minor}$ and P2$_{minor}$ of the first and second minor surfaces 2102 and 2112 are substantially parallel. The distance between planes P1$_{minor}$ and P2$_{minor}$ is a diameter DM of the metering hole 30. The elastic element 23 may be provided as a spring and is coupled at a first end thereof to the third housing part 212 and at a second end thereof to the sealing ball 22. The elastic element 23 thus elastically biases the sealing ball 22 toward the metering hole 30.

As shown in FIGS. 2A, 2B, 3 and 4, the first and second corners 2103 and 2113 are deformed. This deformation results from a coining ball 40 being applied to the first and second corners 2103 and 2113 and loaded until deformation begins. The loading is increased steadily or discretely while deformation continues and is ceased once further increased loading causes negligible increases in further deformation (this process will be described in further detail below). The diameter DC (see FIG. 2A) of the coining ball 40 may be larger than the diameter DS (see FIG. 2B) of the sealing ball 22. As such, the first and second corners 2103 and 2113 (having been deformed by the loading of the coining ball 40) cooperatively form a coined seat 50 at the metering hole 30. In accordance with embodiments, the diameter DC of the coining ball 40 may be about 20% larger than the diameter DS of the sealing ball 22.

In accordance with embodiments, the first and second housing parts 210 and 211 and the sealing ball 22 may have a similar absolute hardness and may be less hard than the coining ball 40. The first and second housing parts 210 and 211 and the sealing ball 22 may be formed from stainless and/or hardened steel or other similar materials (but may also be formed from dissimilar materials during assembly processes in particular to prevent galvanic corrosion). In accordance with further embodiments, the first and second housing parts 210 and 211 may be up to 55 absolute hardness and the sealing ball 22 may have 40-70 absolute hardness.

The coined seat 50 is disposed and configured to provide for seating and re-seating the sealing ball 22. That is, as fluid pressure acting on the sealing ball 22 in the seated condition increases, the sealing ball 22 moves out of the seated condition in opposition to the elastic bias of the elastic element 23 (see FIG. 2B). Conversely, as fluid pressure decreases, the sealing ball 22 is urged by the bias of the elastic element 23 back toward and into the re-seating condition (see FIG. 2A).

In accordance with embodiments, the structure and characteristics of the coined seat 50 are such that the PRV 20 exhibits no leakage (or leakage well within acceptable limits) with the sealing ball 22 in the seated or re-seated conditions.

Figure 3:
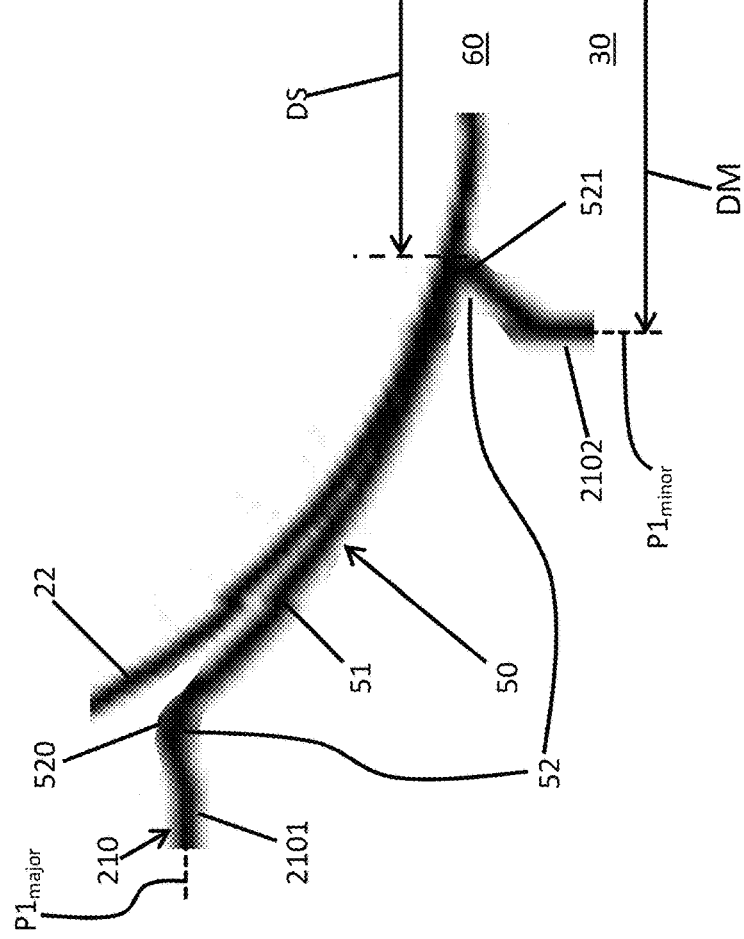
FIG. 3 is an enlarged side view of a portion of the pressure relief valve of FIG. 2A in accordance with embodiments.

With continued reference to FIGS. 3 and 4, the coined seat 50 includes a first curved edge 51 (or a first special surface) and first corners 52, including a first major surface corner 520 and a first minor surface corner 521, at opposite ends of the first curved edge 51 at the first housing part 210 as well as a second curved edge 53 (or a second special surface) and second corners 54, including a second major surface corner 540 and a second minor surface corner 541, at opposite ends of the second curved edge 53 at the second housing part 211. The first and second curved edges 51 and 53 have respective radii of curvatures which are similar to that of the coining ball 40. The sealing ball 22 has a radius of curvature which is less than those of the first and second curved edges 51 and 53 and that of the coining ball 40. This results in the sealing ball 22 tending to engage with the first and second minor surface corners 521 and 541 as a result of the bias applied thereto by the elastic element 23.

As noted above, the first corners 52 include the first major surface corner 520 and the first minor surface corner 521. The first major surface corner 520 protrudes upwardly from the plane $P1_{major}$ and the first minor surface corner 521 protrudes inwardly into the metering hole 30 from the plane $P1_{minor}$. The second corners 54 include a second major surface corner 540 and a second minor surface corner 541. The second major surface corner 540 protrudes upwardly from the plane $P2_{major}$ and the second minor surface corner 541 protrudes inwardly into the metering hole 30 from the plane $P2_{minor}$. The first and second minor surface corners 521 and 541 may be larger than the first and second major surface corners 520 and 540, respectively.

In any case, the first and second minor surface corners 521 and 541 are disposed at the metering hole 30 to define a sealing hole 60. A diameter DS of the sealing hole 60 is measured as a horizontal distance between respective interior tips of the first and second minor surface corners 521 and 541 and is smaller than the diameter DM of the metering hole 30 measured as a horizontal distance between the first and second minor surfaces 2102 and 2112. In accordance with embodiments, the diameter DS of the sealing hole 60 may be about 10% smaller than the diameter DM of the metering hole 30 (e.g., the diameter DM of the metering hole 30 may be about 3 mm and the diameter DS of the sealing hole 60 may be about 2.7 mm).

With reference to FIGS. 5 and 6-9, a method of assembling a PRV, such as PRV 20, is provided.

Figure 5:
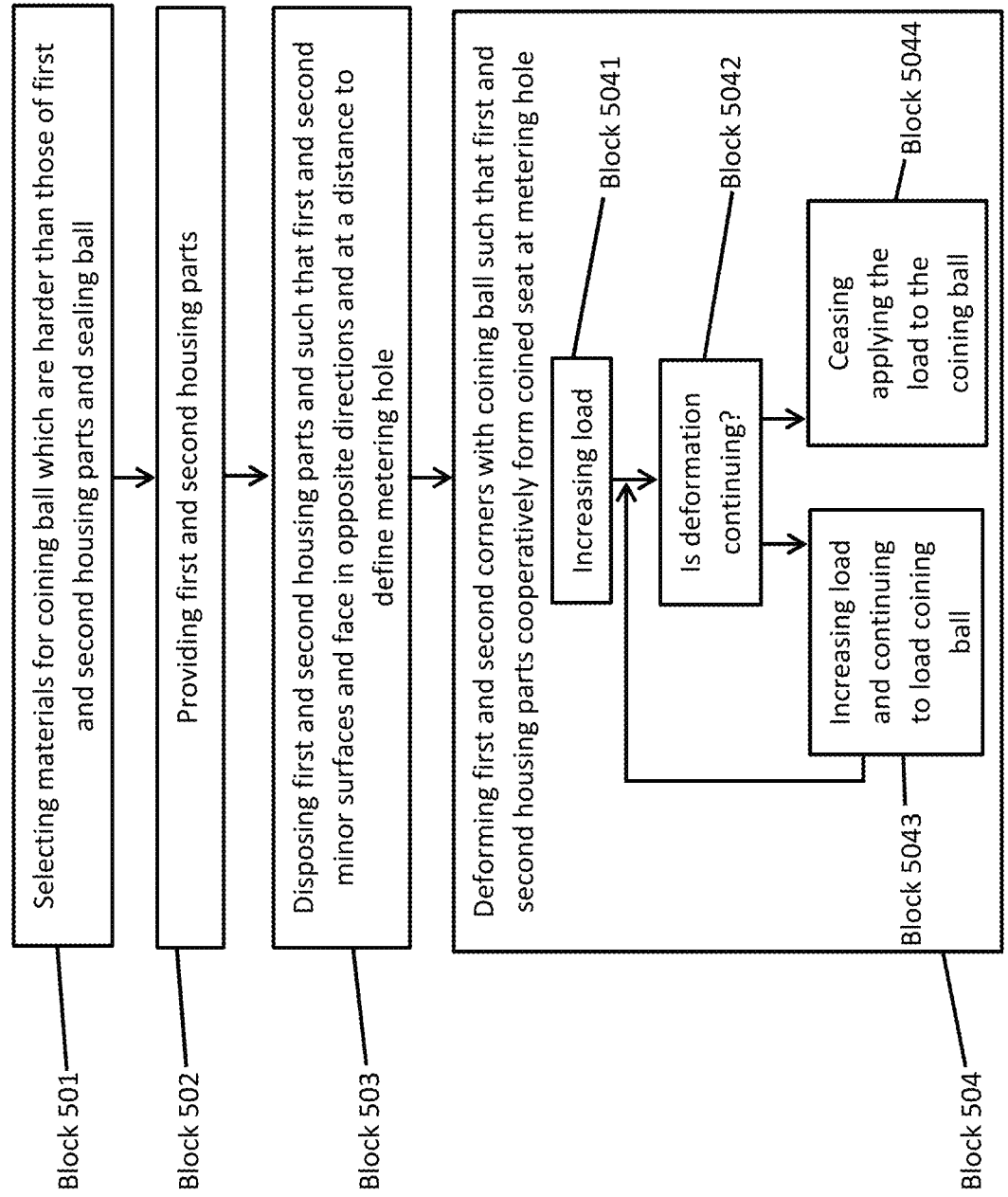
FIG. 5 is a flow diagram illustrating a method of assembling a pressure relief valve in accordance with embodiments.

As shown in FIG. 5, the method includes initially selecting materials for the coining ball 40 which are harder than those of the first and second housing parts 210 and 211 and the sealing ball 22 (block 501), providing the first and second housing parts 210 and 211 to have respective structures as described above (block 502) and disposing the first and second housing parts 210 and 211 such that the first and second minor surfaces 2102 and 2112 face each other in opposite directions and at a distance to define the metering hole 30 toward which the sealing ball 22 will be elastically biased by the elastic element 23 (block 503). The method further includes deforming the first and second corners 2103 and 2113 with the coining ball 40 as described above such that the first and second housing parts 210 and 211 cooperatively form the coined seat 50 described above at the metering hole 30 for seating and re-seating the sealing ball 22 (block 504).

In accordance with embodiments, the deforming of block 504 of FIG. 5 may include increasing a load on the coining ball 40 as deformation begins (block 5041), determining whether the deformation is continuing (block 5042), continuing to increase the load of the coining ball 40 in an event the deformation is determined to be continuing in block 5042 (block 5043) and ceasing the loading of the coining ball 40 in an event continued deformation is determined to be negligible in block 5042 due to the coined seat 50 reaching a state of equilibrium which varies for different materials (block 5044). The deformation is realized as a localized plastic yielding of the materials of the first and second housing parts 210 and 211 whereby the materials effectively take the shape of the coining ball 40. During this deformation, the volume of the yielded materials flows around the coining ball 40 and thus forms the first and second corners 52 and 54 (see FIGS. 3 and 4).

Figure 6:
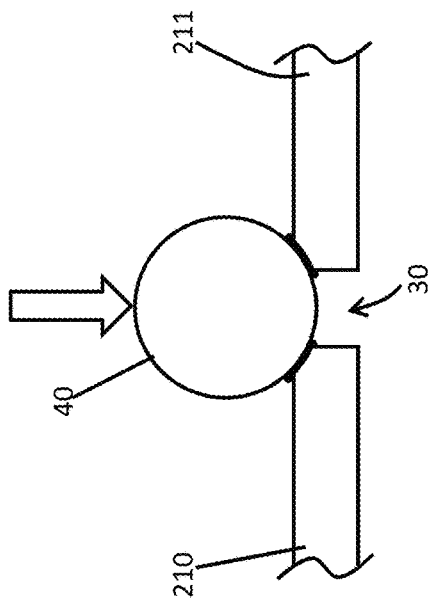
FIG. 6 is an illustration of an early stage of the method of FIG. 5 in accordance with embodiments.
Figure 7:
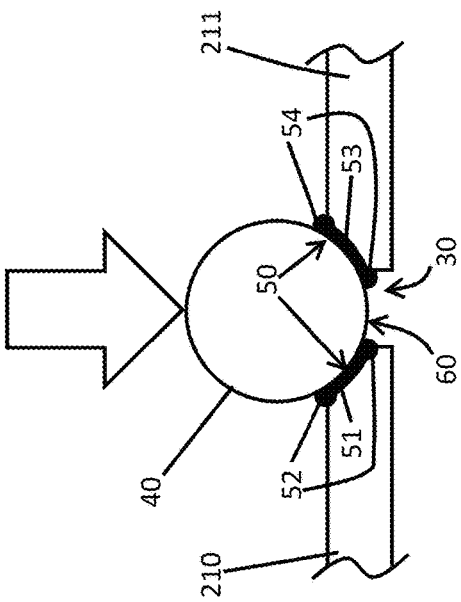
FIG. 7 is an illustration of an intermediate stage of the method of FIG. 5 in accordance with embodiments.
Figure 8:
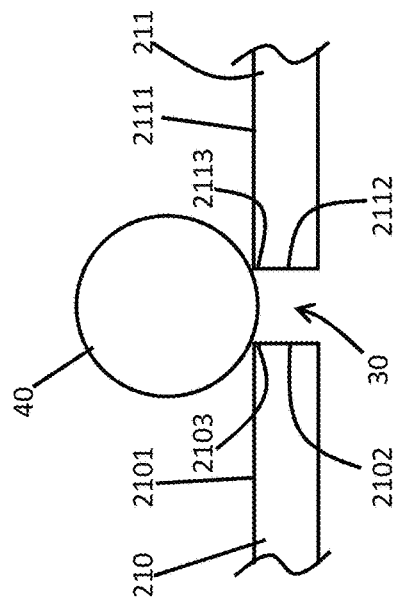
FIG. 8 is an illustration of an intermediate stage of the method of FIG. 5 in accordance with embodiments.
Figure 9:
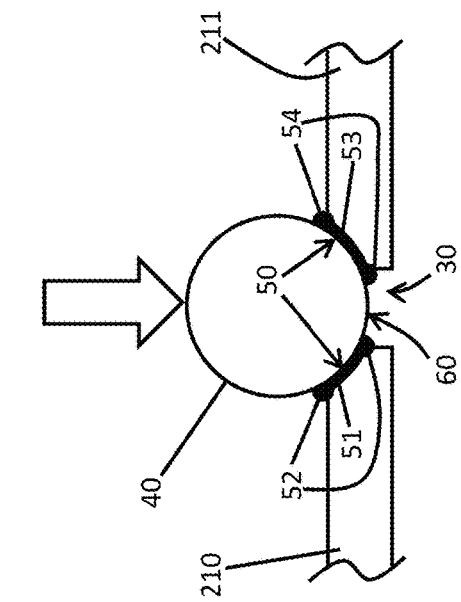
FIG. 9 is an illustration of a late stage of the method of FIG. 5 in accordance with embodiments.

As shown in FIGS. 6-9, an execution of the method of FIG. 5 is illustrated. FIG. 6 shows that the coining ball 40 is applied to the first and second housing parts 210 and 211 and the first and second corners 2103 and 2113 and FIG. 7 shows that the deformation of the first and second housing parts 210 and 211 commences with the coining ball 40 being increasingly loaded. FIG. 8 shows that the deformation of FIG. 7 continues as the loading of the coining ball 40 continues to be increased. FIG. 9, however, shows that further increases of the loading of the coining ball 40 do not result in further deformation beyond what is shown in FIG.

8. Thus, FIG. 9 represents a late stage of the assembly process at which the loading is ceased and the sealing hole 60 is substantially fully formed in the metering hole 30.

The PRV 20 described herein establishes clear and distinguishable pressure characteristics between crack, re-seat and flow point pressures. The PRV 20 also enables reduced valve sizes. This is a significant achievement especially with respect to aerospace qualified PRVs and is far away from any comparable relief valves available in the industry. In addition, the PRV 20 produces reliable metallic-to-metallic sealing (i.e., zero leakage/leakage well within acceptable limits) with clearly distinguishable pressure characteristics.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of producing or forming a pressure relief valve, the method comprising:
   providing first and second housing parts respectively comprising first and second major and minor surfaces and first and second corners at respective intersections of the first and second major and minor surfaces;
   disposing the first and second housing parts such that the first and second minor surfaces face oppositely at a distance to define a metering hole toward which a sealing ball will be elastically biased; and
   deforming the first and second corners with a coining ball having a larger diameter than the sealing ball such that the first and second housing parts cooperatively form a coined seat at the metering hole for seating and re-seating the sealing ball,
   wherein:
   the coined seat comprises first and second curved edges and first and second corners at opposite ends of the first and second curved edges, respectively, at the first and second housing parts, respectively,
   the first and second corners comprise:
      first and second major surface corners which protrude upwardly from respective planes of the first and second major surfaces, respectively, as a consequence of the deforming, and
      first and second minor surface corners which protrude inwardly from respective planes of the first and second minor surfaces, respectively, as a consequence of the deforming, and
   the first and second minor surface corners are disposed at the metering hole to define a sealing hole having a smaller diameter than the metering hole.

2. The method according to claim 1, further comprising selecting materials for the coining ball which are harder than those of the first and second housing parts and the sealing ball.

3. The method according to claim 1, wherein the deforming comprises increasing a load on the coining ball until further deformation is negligible.

* * * * *